J. G. ROBINSON.
PLOW.
No. 30,837. Patented Dec. 4, 1860.
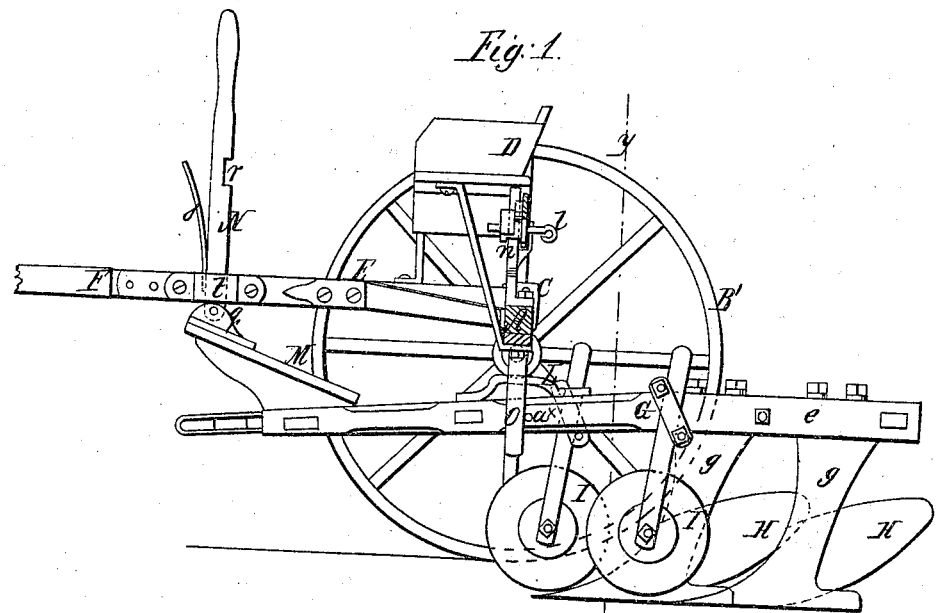
Fig. 1.
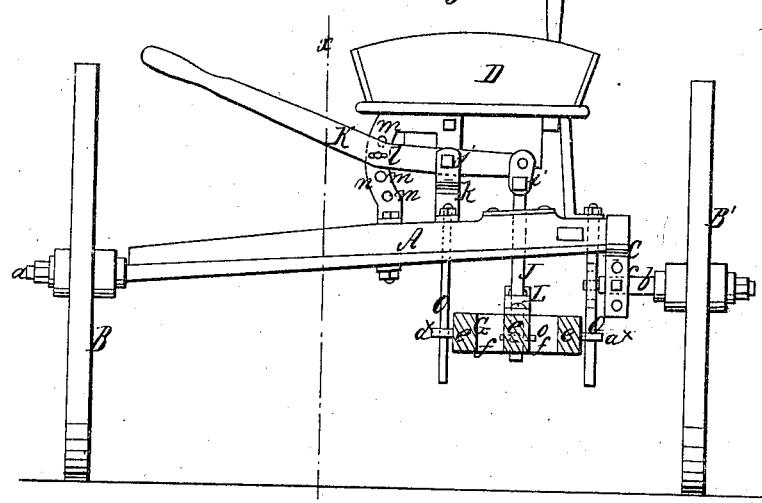
Fig. 2.
Fig. 3.
Witnesses:
J W Coomby
R. S. Spencer
Inventor:
John G. Robinson
per Munn & Co
attorneys

UNITED STATES PATENT OFFICE.

JOHN G. ROBINSON, OF BIDDEFORD, MAINE.

IMPROVEMENT IN PLOWS.

Specification forming part of Letters Patent No. 30,837, dated December 4, 1860.

*To all whom it may concern:*

Be it known that I, JOHN G. ROBINSON, of Biddeford, in the county of York and State of Maine, have invented a new and Improved Plow; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a back view of the same, taken in the line $y\,y$, Fig. 1; Fig. 3, a detached plan of a slotted bar pertaining thereto.

Similar letters of reference indicate corresponding parts in the several figures.

To enable those skilled in the art to fully understand and construct my invention, I will proceed to describe it.

A represents an axle-tree, on one end of which a wheel, B, is placed, the arm $a$ of said wheel being permanently attached to the axle. B' is the other wheel, the arm $b$ of which is not permanently attached to the axle-tree A, but is secured by a bolt, $c$, in a slotted pendant, C, said pendant having a series of holes made through it, through either of which the bolt $c$ may pass in order to adjust the wheel B' higher or lower. This will be fully understood by referring to Fig. 2.

On the axle A the driver's seat D is placed, and to the axle A a bar, E, is rigidly attached at right angles, the front end of bar E having the draft-pole F attached, as shown in Fig. 1.

G is a frame, to which the plows H are attached. This frame may be constructed of a series of parallel bars, $e$, connected by cross-ties $f$. The plows H (one or more) may be attached to the bars $e$ by having their standards or feet $g$ attached to the bars by bolts $h$, as shown in Fig. 1.

In front of the plows rotary colters I may be placed.

The plow-frame G is attached to the axle A by means of a slide-bar, J, which passes vertically through the axle, and is connected by a link, $i$, to a lever, K, the fulcrum $j$ of which is an upright bar, $k$, on the axle. This lever K may be secured at any desired point in the range of its movement by means of a pin, $l$, which passes through the lever and through either of a series of holes, $m$, in a perforated bar, $n$, on the axle, as shown clearly in Fig. 2. The lower end of the bar J is secured in the frame G by means of a pin, $o$, which passes through an eye at the lower end of the bar J. The bar J passes through a metal slotted bar, L, which is attached to the upper surface of the frame G. The back part of the slot of this bar is made narrower than the front part, as shown clearly at $p'$ in Fig. 3. The front part of the frame G has an inclined foot-board, M, attached to it, and to this foot-board an arm, N, is secured by a joint, $q$. This arm N has a recess, $r$, made in it, and a spring, $s$, is attached to the bar, as shown clearly in Fig. 1. The arm N passes through a staple or guide, $t$, attached to the bar E, and the notched arm N serves as a catch, which, when depressed, will hold the plows upward out of the ground, the frame G being tilted by the driver depressing the front part of the frame G with his feet, which bear on the foot-board M.

When the plows are in operation the frame G is allowed to work longitudinally on the pin $o$, and the eye of bar J is sufficiently large to admit of a lateral movement of the frame. When, however, the front part of the frame G is depressed and the plows thrown out of the ground, the frame is held steadily and firm in an elevated position in consequence of the bar J being in the back and narrow part of the slot-bar L.

By adjusting lever K the frame G, and consequently the plows, may be elevated and depressed, and the plows made to penetrate the earth at a greater or less depth, the wheel B' being adjusted higher or lower to suit the depth of the furrow by adjusting its arm $p$, as previously referred to.

In case plows are used to form trench-furrows, and are attached to the frame at different points, arms $b$, of different lengths, may be used, so that the wheel B' may be made to follow the furrow at all times.

I would remark that two guide-bars, O O, are attached to the axle A, and extend down, one at each side of the plow-frame, and bear against pins $a^x$, attached thereto.

Having thus described my invention, what I claim as new, and desire to secure by Letters Patent, is—

The arrangement of the arm $b$, slotted pendant C, and axle A with the plow-frame G, adjustable bar J, and adjustable lever K, as and for the purposes herein shown and described.

JOHN G. ROBINSON.

Witnesses:
THOMAS H. BLY,
JEREMIAH MOORE.